United States Patent [19]

Zarouni

[11] 4,041,243
[45] Aug. 9, 1977

[54] COIN BOX SIGNALING ARRANGEMENT
[75] Inventor: Alfred Zarouni, Middletown, N.J.
[73] Assignee: Bell Telephone Laboratories, Incorporated, Murray Hill, N.J.
[21] Appl. No.: 724,651
[22] Filed: Sept. 20, 1976
[51] Int. Cl.² .......................................... H04M 17/02
[52] U.S. Cl. ................................. 179/6.5; 179/6.3 R; 194/16
[58] Field of Search .................... 179/6.3 R, 6.31, 6.4, 179/6.5, 1 MN, 17 C; 194/1 E, 1 F, 8-16, DIG. 3, DIG. 28

[56] References Cited
U.S. PATENT DOCUMENTS

| 2,883,463 | 4/1959 | Goodale, Jr. et al. | 179/6.3 R |
| 3,091,663 | 5/1963 | Stokes | 179/6.3 R |
| 3,449,524 | 6/1969 | Pharis | 179/6.3 R |
| 3,496,300 | 2/1970 | Stokes | 179/6.3 R |

Primary Examiner—Kathleen H. Claffy
Assistant Examiner—Gerald L. Brigance
Attorney, Agent, or Firm—James W. Falk

[57] ABSTRACT

A signaling arrangement for indicating to a remote location that coins in the cash receptacle of a coin-operated device have accumulated to a predetermined fill level is disclosed. In particular, a coin telephone station is disclosed, which station has a tone oscillator connected to an associated central office by a telephone line. The oscillator is controlled by a three-input logic gate. One input of the gate is enabled by a coin probe when the coin box is filled to a predetermined level. Another input of the logic gate is enabled by a flip-flop that is set when a coin collect potential is received by the station over the line. The third input of the logic gate is enabled when talking battery is applied to the line. The logic device thereupon operates the oscillator which generates a tone signal that is sent to the central office over the line, indicating to the office that the coin box is full.

7 Claims, 1 Drawing Figure

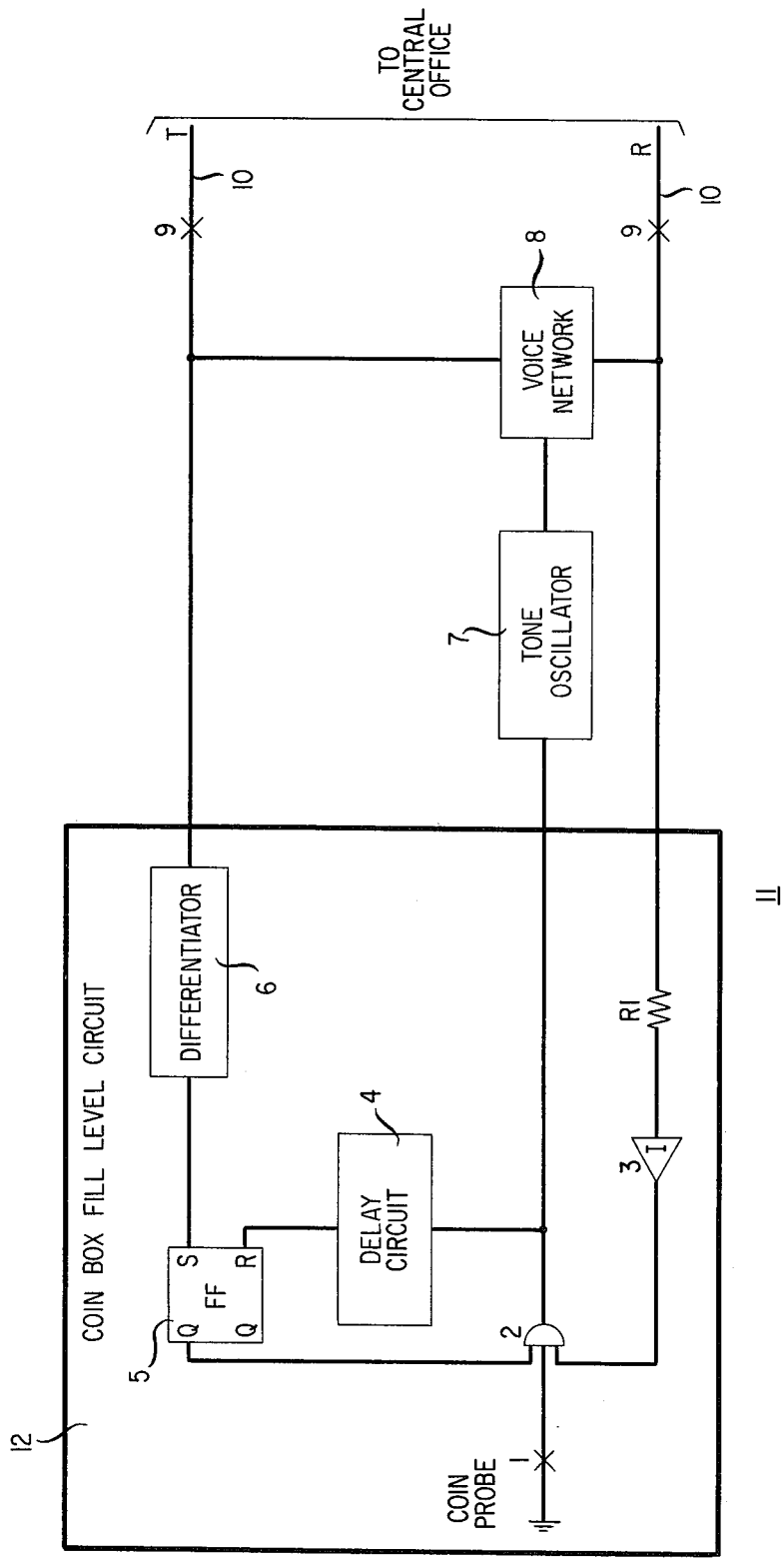

COIN BOX SIGNALING ARRANGEMENT

BACKGROUND OF THE INVENTION

1. Field of the Invention

This invention relates to arrangements for determining when the cash receptacle of a coin-operated device is filled to a predetermined level and more particularly to arrangements for signaling a central location when the fill in coin boxes of coin telephone stations reaches predetermined levels.

2. Description of the Prior Art

One of the most important maintenance problems associated with coin-operated devices that are placed in public locations is the scheduling of coin collections, since most common coin-operated devices contain a cash receptacle or coin box which is removed from the device and emptied periodically by a coin collector. The scheduling problem is particularly important to the telephone industry which maintains many coin-operated telephone stations, each requiring periodic collections. In the past, the usual way of determining when the coin boxes were to be emptied was to base collection intervals on extrapolations of previous records. However, it became apparent that such extrapolations were inaccurate and resulted in customer dissatisfaction because the coin boxes often became overfull and interfered with coin returns during the operation of the coin station. In addition, coin collectors were frequently dispatched to make a collection when a coin box was only partially full, resulting in a waste of time and money for the telephone company.

In an attempt to circumvent these problems, many signaling arrangements have been developed. One such arrangement utilized an oscillator at the coin telephone station. The oscillator was enabled by a mechanical probe which was pushed into operating position by an accumulating stack of coins in the coin box. When the coin stack reached a predetermined height, the oscillator was enabled. Subsequently, when a coin collect potential was received from a telephone central office, the oscillator operated to place a tone burst on the telephone line, which burst was received by a central location to indicate that a coin collection should be scheduled for the station.

One problem with the above oscillator arrangement is that the time length of the tone burst produced by the oscillator must be relatively long. The long tone burst is required by the operation of the coin station. During normal operation, the coin station line is disconnected from the central office when a coin collect potential is applied to the line. Thus, the tone oscillator associated with the coin fill detector must apply a tone signal to the station line until the line has been reconnected to the central office following the disconnection of the line upon application of the coin collect potential. The length of time during which the station is disconnected from the central office varies according to station location and the operation of the equipment at the central office. Therefore, the length of the tone burst required is relatively long to accommodate worst case conditions. Since the tone burst can be heard by the customer, it is often annoying and results in customer dissatisfaction.

Accordingly, it is one object of this invention to improve the efficiency of coin collection from coin-operated devices.

It is another object of the invention to signal a remote location that the cash receptacle in a coin-operated device is filled to a predetermined height.

It is a further object of the invention to control a signal generator located at the station so that a relatively short tone burst is required to inform a central location that a coin collection should be scheduled.

SUMMARY OF THE INVENTION

These and other objects of the invention are achieved in accordance with one illustrative embodiment thereof wherein a tone generator located in the coin-operated device is controlled by a logic gate which has three inputs. A first input of the logic gate is enabled when the coin fill in the cash receptacle of the device reaches a predetermined level. A second input of the logic gate is enabled by circuitry which responds to a first signal received over an associated transmission line. The third input of the logic gate is enabled by a circuitry which responds to a second signal received over the transmission line, and the logic gate thereupon operates the tone oscillator to generate a tone signal, indicating that the cash receptacle is full.

According to a feature of the invention, the circuitry for enabling the second gate input comprises a memory device and circuitry which responds to the first signal for placing the memory device into a predetermined state to enable the second gate input. In addition, circuitry operated by the actuation of the oscillator is provided to disable the second input of the logic gate after a predetermined time interval. This circuitry allows the tone burst length to be controlled at the device and avoids overly long tone bursts.

According to one aspect of the invention, the coin fill level apparatus is utilized in a coin telephone station and a memory device is provided, which memory device is placed into a predetermined state to enable the second gate input by circuitry which responds to a coin collect potential received by the station. In addition, the third gate input is enabled by circuitry which responds to central office battery applied to an associated telephone line.

In accordance with another aspect of the invention, the coin telephone station has a coin box containing a coin probe. The coin probe enables one input of an AND gate when the coin fill reaches a predetermined level. Another input of the AND gate is enabled by a flip-flop which is set by a differentiator when a coin collect potential is received by the station. The third input of the AND gate is enabled by an inverter when battery voltage is reapplied to the associated telephone line after application of the coin collect potential. The AND gate thereupon operates a tone oscillator at the station, which oscillator sends a tone signal to a central location to indicate that the coin box is full. A delay circuit operated by the actuation of the oscillator resets this flip-flop after a predetermined time interval to disable the AND gate and the oscillator.

Advantageously, it is a feature of the invention that the tone oscillator at the coin station is not actuated until the station is reconnected to the central office after a coin collect potential has been received. The length of the tone burst may be then relatively short and still meet worst case conditions at the central office.

BRIEF DESCRIPTION OF THE DRAWING

A single sheet drawing illustrates in schematic form the logic circuit located in the telephone station which applies a signaling tone to the telephone line of a coin-operated telephone.

DETAILED DESCRIPTION

Referring to the drawing, a coin telephone 11 associated with the inventive signaling arrangement 12 (the inventive circuitry is shown in a heavy black line box) is connected to the central office by means of line 10 (which includes a tip conductor T and a ring conductor R). A voice network 8 is connected to line 10 in order to convert voice signals into electrical signals for transmission to the central office. The construction and operation of voice network 8 is well known to those skilled in the telephone art and will not be described further herein since such construction is not important for an understanding of the present invention. Voice network 8 and the remainder of the circuitry shown in the drawing is connected to line 10 and the central office by switchhook contacts 9, which contacts are closed in a well-known manner when the telephone handset (not shown) is lifted from its cradle.

When contacts 9 are closed, a ground potential source at the central office is applied to tip lead T, and negative battery (also at the central office) is applied to ring lead R. This voltage is used to provide power to voice network 8 and to operate the transmitter and receiver (not shown) in the telephone set. The voltage (which is typically negative 48 volts) can be reduced to a lower voltage (typically 5 volts) in a well-known manner by means of a voltage reduction power supply (not shown) in order to provide power for the various logic elements 2 through 6 of signaling arrangement 12. A voltage reducer comprising series transistors controlled by a zener reference diode and suitable for use with the illustrative embodiment is shown in the Motorola Zener Diode and Rectifier Handbook, 2nd edition, 1961, p. 39. A capacitor (not shown) can be placed across the output of the voltage reduction apparatus to maintain power to the logic circuitry when negative battery from the central office is removed during an application of a coin collect potential, as will be hereinafter described. If such a reducing voltage supply is used, then a logical high signal is equivalent to ground potential and a logical low signal is equivalent to negative 5-volt potential.

Tip lead T in the drawing is connected to a differentiator 6 so that changes in voltage on tip lead T produce voltage pulses at the output of differentiator 6, which pulses are then applied to the set input of flip-flop 5. Differentiator 6 is a well-known circuit device and will not be described further herein. The output Q of flip-flop 5 is in turn connected to one input of three-input AND gate 2 so that gate 2 is partially enabled when flip-flop 5 is set.

The middle input of AND gate 2 is connected to coin probe 1. Coin probe 1 is constructed so that the middle input of AND gate 2 is grounded when the coin fill in the coin box (not shown) of station 11 reaches a predetermined level. Coin probe 1 is a well-known device in the art and may be a mechanical probe which has a mechanical lever that is physically moved by an accumulating coin stack to close an electrical contact. Alternatively, probe 1 may be an electrical probe wherein a conducting path is established through coins themselves when the coin stack reaches a predetermined height. An example of a mechanical probe which can be used in the illustrative embodiment is shown in U.S. Pat. No. 3,091,663, issued to R. R. Stokes on May 18, 1963 (FIG. 2); and an example of an electrical probe which is suitable for use in the embodiment is shown in U.S. Pat. No. 3,492,428, issued to C. D. Hays et al on Jan. 27, 1970 (FIGS. 2 through 7).

The lower input of AND gate 2 is connected to the output of inverter 3. The input of inverter 3 is attached to ring lead R via resistor R1 in order to provide a signal to AND gate 2 when voltage is applied to ring lead R as will be described hereinafter. Resistor R1 serves to limit the current from inverter 3 when negative battery is applied to lead R.

The output of AND gate 2 is connected to delay circuit 4 and tone oscillator 7. Delay circuit 4 provides an output to the reset input of flip-flop 5 after a predetermined time delay to reset flip-flop 5, thereby disabling AND gate 2. This action allows a tone burst of a predetermined length to be generated.

Tone oscillator 7 is also controlled by a high signal (ground) on the output of AND gate 2 to apply a tone signal to line 10 via voice network 8. Tone oscillator 7 is a well-known device in the telephone art and will not be discussed further herein.

Advantageously, the illustrative embodiment operates in accordance with the principles of the invention to signal the central office during an actual calling sequence initiated from the coin station. Thus, no special interrogation signal from the central office is necessary to initiate coin level detection. In particular, the operation of the circuit is initiated when contacts 9 are closed by the action of the switchhook to the station preparatory to beginning a calling sequence. When contacts 9 close, power is applied to the logic elements in the circuit as previously described. During the call sequence, a coin collect potential (typically positive 130 volts) is momentarily applied to the tip side of the line. This voltage causes coins which were inserted into the coin telephone to be collected in a well-known manner, which collection operation is not important for the operation of the invention. The coin collect potential is applied to differentiator 6 which converts the leading edge of the applied coin collect voltage into a positive pulse, which in turn sets flip-flop 5. The output of flip-flop 5 applies a high signal to AND gate 2. AND gate 2 also receives a high signal from the coin probe via contact 1 when the coin level has reached a predetermined level in the coin box. Subsequently, after the coin collect potential has been removed, negative battery is reapplied to lead R by the central office. Negative battery on lead R causes inverter 3 to apply a high signal to gate 2. Gate 2 is thus enabled to produce a high signal at its output, which signal activates tone oscillator 7 to apply tone signal to the telephone line via voice network 8. The high signal also activates delay circuit 4, causing a reset pulse to be applied to flip-flop 5 after a predetermined interval. Flip-flop 5, subsequently being reset, places a low signal on its Q output, disabling gate 2 and oscillator 7. Advantageously, therefore, tone oscillator 7 is not activated until telephone line 10 has been reconnected at the central office after the coin collect potential has been applied. Therefore, the duration of the tone burst applied to line 10 by oscillator 7 can be accurately controlled in duration by appropriate adjustment of delay 4.

The tone signal generated by oscillator 7 is applied to line 10 via voice network 8. Such a tone signal can easily be detected by appropriate equipment located in the telephone central office. However, an even more convenient location for the tone detector is in an associated traffic service position system (TSPS) office. (A TSPS arrangement is shown in U.S. Pat. No. 3,484,560 issued to R. J. Jaeger et al on Dec. 16, 1969.) This location has the advantage that the TSPS office serves many central offices and thus can effectively concentrate coin collection data. The arrangement avoids having separate dedicated coin fill lines from each central office to a coin collection center. In addition, TSPS offices have automatic number identification equipment associated therewith which equipment can easily be used to identify the coin station needing a collection. Thus, the local central office may be arranged to ignore the coin collect signal which is in turn detected by a serving TSPS center.

What is claimed is:

1. A signaling arrangement for indicating to a remote location that coins in the cash receptacle of a coin-operated device have accumulated to a predetermined fill level, said device being interconnected to said location by transmission means and having an oscillator actuatable to apply a tone signal to said transmission means, said arrangement comprising
    a gate circuit responsive to the presence of three enabling inputs for actuating said oscillator;
    means responsive to a predetermined accumulation level of coins in said receptacle for enabling one input of said gate;
    means responsive to a first predetermined potential on said transmission means for enabling a second input of said gate; and
    means responsive to a second predetermined potential on said transmission means for enabling a third input of said gate.

2. A signaling arrangement according to claim 1 wherein said means responsive to said first predetermined potential comprises
    memory means; and
    means responsive to said first predetermined potential for placing said memory means into a predetermined state to enable said second input.

3. A signaling arrangement according to claim 2 wherein said memory means comprises a flip-flop.

4. A signaling arrangement according to claim 1 further comprising
    means responsive to the actuation of said oscillator for inhibiting said means responsive to said first determined potential after a preselected time interval to disable said second input of said gate, whereby said oscillator is prevented from further applying said tone signal to said transmission means.

5. An arrangement for signaling to a central location that coins in the coin box of a coin telephone connected to a telephone central office by a telephone line have accumulated to a predetermined fill level, said coin telephone having an oscillator therein controllable to apply a tone signal to said line, said arrangement comprising
    a logic gate having a first, a second and a third enabling input and an output for actuating said oscillator when all three gate inputs are enabled;
    means responsive to a predetermined accumulation level of coins in said coin box for enabling said first gate input;
    memory means;
    means responsive to a coin collect potential appearing on said line for placing said memory means into a preselected state to enable said second gate input; and
    means responsive to battery potential appearing on said line for enabling said third gate input.

6. A signaling arrangement according to claim 5 further comprising
    reset means responsive to the actuation of said oscillator for resetting said memory means after a predetermined time interval to cause said gate to be disabled.

7. An arrangement for signaling to a telephone central office that coins in the coin box of a coin telephone connected to the office by a telephone line have accumulated to a predetermined fill level, said coin telephone having an oscillator therein controllable to apply a tone signal to said line, said arrangement comprising
    an AND gate having a first, a second and a third enabling input and an output for actuating said oscillator when all three gate inputs are enabled;
    a coin probe responsive to a predetermined accumulation level of coins in said coin box for enabling said first gate input;
    a flip-flop having a set and reset input and an output connected to said second gate input;
    a differentiator responsive to a coin collect potential appearing on said line for applying a pulse to said set input of said flip-flop to cause said second gate input to be enabled;
    an inverter connected to said telephone line and said third input of said AND gate, said inverter being responsive to battery potential applied to said telephone line for enabling said third gate input; and
    a delay circuit having an input connected to said AND gate output and an output connected to said reset input of said flip-flop, said delay circuit being responsive to the actuation of said AND gate for applying a reset pulse to said flip-flop after a preselected time interval.

* * * * *